(12) United States Patent
Katzenberger et al.

(10) Patent No.: US 8,454,281 B2
(45) Date of Patent: Jun. 4, 2013

(54) CHAMFER TOOL

(75) Inventors: Michael D. Katzenberger, Florissant, MO (US); Ralph D. Czeschin, Washington, MO (US); Anthony P. Slade, St. Ann, MO (US)

(73) Assignee: The Boeing Company, Chicago, IL (US)

( * ) Notice: Subject to any disclaimer, the term of this patent is extended or adjusted under 35 U.S.C. 154(b) by 1314 days.

(21) Appl. No.: 12/200,235

(22) Filed: Aug. 28, 2008

(65) Prior Publication Data

US 2010/0054883 A1     Mar. 4, 2010

(51) Int. Cl.
*B23B 51/10*     (2006.01)

(52) U.S. Cl.
USPC ............... 408/82; 408/93; 408/100

(58) Field of Classification Search
USPC .......... 408/79–83.5, 241 S, 93, 100, 707–709
IPC ...................................... B23B 31/10
See application file for complete search history.

(56) References Cited

U.S. PATENT DOCUMENTS

| | | | | |
|---|---|---|---|---|
| 1,376,451 A | * | 5/1921 | Martell | 408/234 |
| 1,777,047 A | * | 9/1930 | Moen | 408/83.5 |
| 1,790,378 A | * | 1/1931 | Howser | 408/83.5 |
| 1,846,890 A | * | 2/1932 | Miller | 408/83.5 |
| 1,905,819 A | * | 4/1933 | Doyle | 408/83.5 |
| 2,102,707 A | * | 12/1937 | Holhut | 408/83.5 |
| 2,230,639 A | * | 2/1941 | Calcagni | 409/309 |
| 2,583,429 A | * | 1/1952 | Johnson | 175/325.3 |
| 3,645,640 A | | 2/1972 | Zukas | |
| 3,762,831 A | | 10/1973 | Nicholson | |
| 3,945,752 A | | 3/1976 | Bennett | |
| 4,017,201 A | * | 4/1977 | Adams et al. | 408/82 |
| 4,212,571 A | * | 7/1980 | Reedy et al. | 408/82 |
| 4,331,410 A | * | 5/1982 | Schnabel | 408/94 |
| 4,548,530 A | * | 10/1985 | Weiblen | 408/79 |
| 4,868,962 A | * | 9/1989 | McArdle et al. | 29/889.6 |
| 5,487,627 A | | 1/1996 | Kasutani et al. | |
| 5,628,591 A | * | 5/1997 | Gamble | 408/75 |
| 6,368,032 B1 | | 4/2002 | Chen | |
| 2003/0113176 A1 | | 6/2003 | Kress | |
| 2005/0260047 A1 | * | 11/2005 | Keiper | 408/201 |

FOREIGN PATENT DOCUMENTS

DE          3910427 A1     10/1990

OTHER PUBLICATIONS

PCT International Search for applicaiton PCT/US2009/055307 dated Nov. 12, 2009.

* cited by examiner

*Primary Examiner* — Eric A Gates
(74) *Attorney, Agent, or Firm* — Yee & Associates, P.C.

(57) ABSTRACT

An apparatus having a body, a pilot, a blade, a shaft, and a guide. The body may have a first end and a second end. The pilot may extend from the first end of the body and the blade may be attached to the body and positioned longitudinally on the body at the first end. The shaft may extend from the second end of the body, and the guide may be configured to receive the pilot.

11 Claims, 9 Drawing Sheets

CHAMFER TOOL

BACKGROUND INFORMATION

1. Field

The present disclosure relates generally to manufacturing and, in particular, to cutting tools. Still more particularly, the present disclosure relates to a method and apparatus for producing a chamfer on a part using a cutting tool.

2. Background

In manufacturing objects, holes may be formed and/or drilled into and/or through an object. For example, without limitation, a hole may be formed through a wing panel and a spar, such that a fastener may be placed through the hole to secure these parts together. In yet another example, a hole may be formed through a lug in a structure, such as, for example, without limitation, a rib of an aircraft wing. A bearing may be placed into the hole for rotatably attaching other components, such as, for example, without limitation, control surfaces, like flaps.

In forming these types of holes, a chamfer may be created at and/or around one or both ends of the hole. A chamfer may be a bevel and/or groove and may have a flat surface. A chamfer may be created by cutting off an edge of a structure such as, for example, without limitation, an edge of a hole. For example, a chamfer may be created to form a counter-sink for a hole for use in receiving a fastener. A chamfer also may be created in a hole used to receive a part, such as, for example, without limitation, a bearing.

The shape, size, angle, and/or other suitable parameters of a chamfer may be important to provide a proper fit for parts.

Accordingly, there is a need for a method and apparatus for increasing the precision at which a chamfer can be made, which overcomes the problems described above.

SUMMARY

In one advantageous embodiment, an apparatus may comprise a body, a pilot, a blade, a shaft, and a guide. The body may have a first end and a second end. The pilot may extend from the first end of the body and the blade may be attached to the body and positioned longitudinally on the body at the first end. The shaft may extend from the second end of the body, and the guide may be capable of receiving the pilot.

In another advantageous embodiment, a chamfer forming system may comprise a body, a pilot, a blade, a shaft, a guide, a clamp, a screw, a drill, and a lug. The body may have a first end, a second end, and a slot formed in the body. The pilot may extend from the first end of the body. The blade may be capable of being secured in the slot and positioned longitudinally on the body at the first end and may be capable of being moved to a selected position of the blade with respect to the first end of the body. The shaft may extend from the second end of the body. The guide may have a housing with a cavity and a ring capable of being placed in the cavity and providing a positive stop, wherein the ring may be capable of receiving an end of the pilot and may be capable of controlling a depth of a chamfer formed by the blade. The clamp and the screw may be capable of securing the blade in the slot. The drill may have a tool holder, wherein the shaft may be capable of being secured in the tool holder. The lug for an aircraft hinge may have a hole, wherein the hole may be capable of receiving the guide at a first end of the hole and the first end of the body with the pilot at a second end of the hole and wherein the pilot may engage the guide.

In yet another advantageous embodiment, a method may be present for forming a chamfer. A guide may be placed into a first end of a hole. A first end of a body having a pilot extending from the end into a first end of the hole may be moved, wherein the pilot may engage the guide and wherein the body may have a blade. The body may be rotated to form the chamfer in the second end of the hole.

In still yet another advantageous embodiment, a method may be present for forming chamfers in a hole in a lug for an aircraft hinge. The method may identify a depth for the chamfer, and select a ring capable of being placed into a cavity in a housing of a guide. The ring may be selected to limit how far a pilot can move into the hole to limit cutting of the chamfer by a blade to a desired depth. The ring may be placed into the cavity in the housing of the guide. The guide having the cavity may be placed into a first end of the hole, and a shaft may be secured in a tool holder. An end of a body having a pilot extending from the end into a second end of the hole may be moved, wherein the pilot may engage the guide and wherein the body may have the blade. The body may be rotated after the pilot may engage the guide. Rotation of the body may be halted when the guide limits further movement of the guide into the hole to form a first chamfer in the second end of the hole. The guide may be placed into the second end of the hole after forming the first chamfer. The body having the pilot may be moved to the first end of the hole, wherein the pilot may engage the guide placed into the second end of the hole. The body may be rotated after the pilot may engage the guide after moving the body to form a second chamfer in the first end of the hole.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
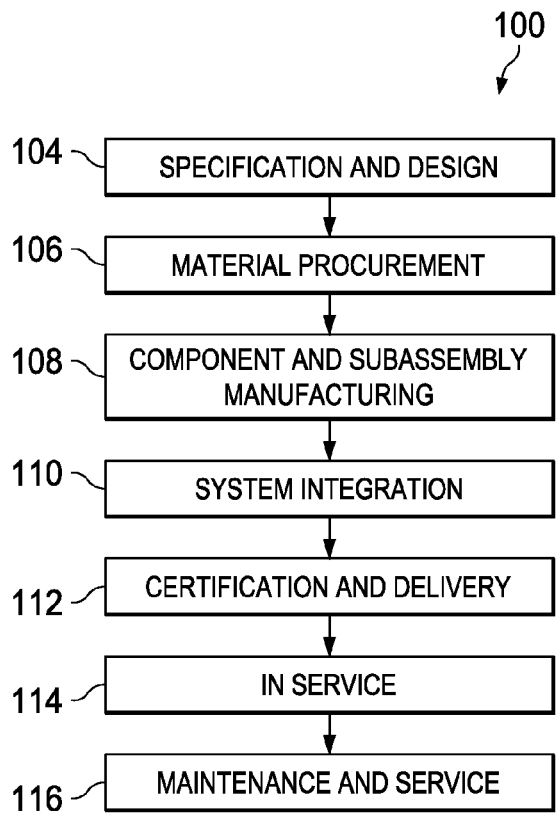
FIG. 1 is a diagram illustrating an aircraft manufacturing and service method in which an advantageous embodiment may be implemented.
Figure 2:
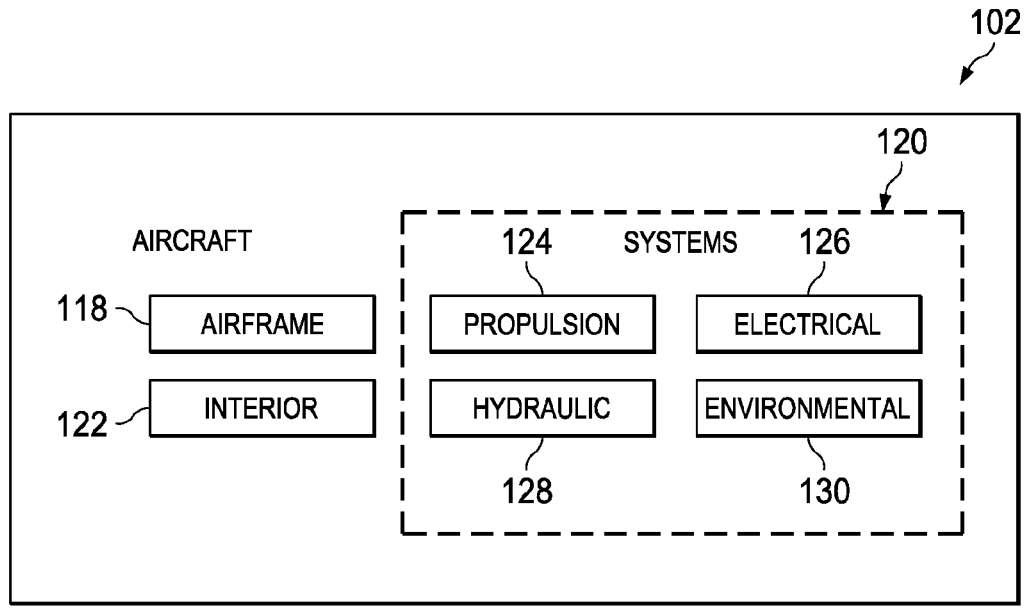
FIG. 2 is a diagram of an aircraft in accordance with an advantageous embodiment.

Referring more particularly to the drawings, embodiments of the disclosure may be described in the context of aircraft manufacturing and service method 100 as shown in FIG. 1 and an aircraft 102 as shown in FIG. 2. During pre-production, aircraft manufacturing and service method 100 may include specification and design 104 of aircraft 102 and material procurement 106.

During production, component and subassembly manufacturing 108 and system integration 110 of aircraft 102 takes place. Thereafter, aircraft 102 may go through certification and delivery 112 in order to be placed in service 114. While in service by a customer, aircraft 102 is scheduled for routine maintenance and service 116 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major system subcontractors; a third party may include, for example, without limitation, any number of venders, subcontractors, and suppliers; and an operator may be an airline, leasing company, military entity, service organization, and so on.

As shown in FIG. 2, aircraft 102 produced by aircraft manufacturing and service method 100 may include airframe 118 with a plurality of systems 120 and interior 122. Examples of systems 120 include one or more of propulsion system 124, electrical system 126, hydraulic system 128, and environmental system 130. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 108 may be fabricated or manufactured in a manner similar to components or subassemblies produced while aircraft 102 is in service.

Also, one or more apparatus embodiments, method embodiments, or a combination thereof may be utilized during component and subassembly manufacturing 108 and system integration 110, for example, without limitation, by substantially expediting assembly of or reducing the cost of aircraft 102.

Similarly, one or more of apparatus embodiments, method embodiments, or a combination thereof may be utilized while aircraft 102 is in service, for example, without limitation, to maintenance and service 116. As a specific example, an advantageous embodiment may be implemented during component and sub-assembly manufacturing 108 to create chamfers in holes in lugs for receiving bearings for use in trailing edge flaps for aircraft 102.

The different advantageous embodiments recognize and take into account that some buildups between parts may have large tolerances. In some cases, however, the tolerance may need to be tighter and/or more stringent to provide for a proper fit. For example, without limitation, bearings used for trailing edge flaps in an aircraft may require a higher tolerance than other components. For example, without limitation, the chamfer for a hole may have a tolerance of around plus or minus 0.0020 of an inch ($^{20}/_{1,000}$'s) for a bearing that is to be placed into the hole.

The different advantageous embodiments recognize and take into account that variables and tolerances may require depths of chamfers and holes to be checked for each individual piece in a structure on which chamfers are used. When large production runs are required, the different advantageous embodiments recognize and take into account that this type of process may become a tedious and time-consuming operation. The different advantageous embodiments recognize and take into account that currently used tool systems may precisely set depths for chamfers, but these depths may be based on a measurement of the depth with respect to the part.

Thus, the different advantageous embodiments provide a method and apparatus for forming chamfers and parts. In one advantageous embodiment, a body may have a first end and a second end. A pilot may extend from the first end of the body. Further, the apparatus may include a blade attached to the body and positioned on the body at the first end. A shaft may extend from a second end.

A guide also may be present that may be capable of receiving the pilot. In these examples, the guide may be capable of providing a positive stop for controlling the depth of a chamfer formed by the blade in a hole. The guide also may be used to set a position for the blade positioned on the body.

These different advantageous embodiments may not require adjusting the depth relative to a part. Instead, the depth may be pre-set once using the guide to provide a fixed and repeatable depth for multiple numbers of chamfers formed in different holes.

Figure 3:
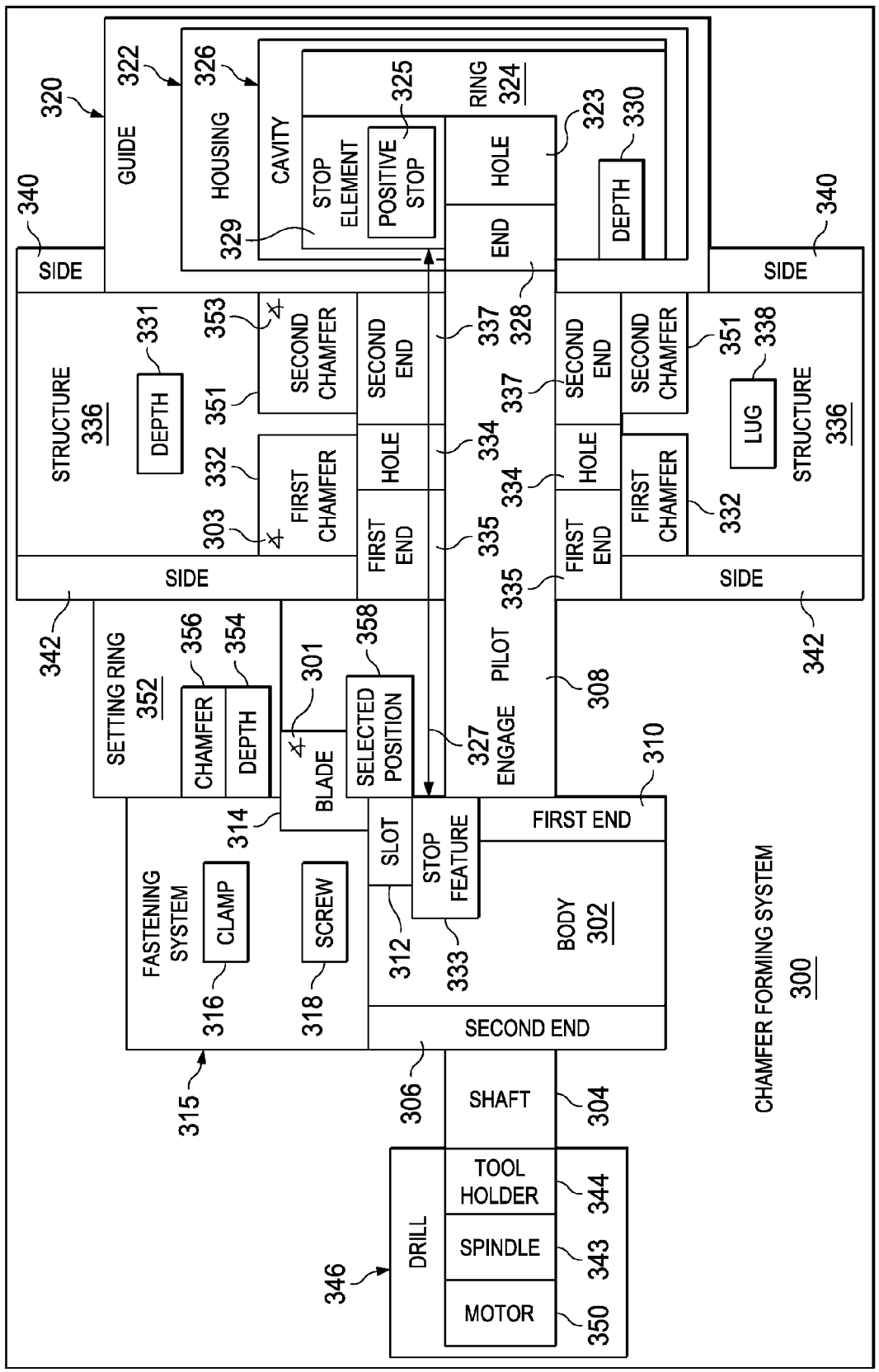
FIG. 3 is a diagram illustrating a chamfer forming system in accordance with an advantageous embodiment.

With reference now to FIG. 3, a diagram illustrating a chamfer forming system is depicted in accordance with an advantageous embodiment. In this example, chamfer forming system 300 includes body 302 with shaft 304 extending from second end 306 of body 302. Pilot 308 extends from first end 310 of body 302.

Body 302, shaft 304, and pilot 308 may be formed integrally as a single component. In other advantageous embodiments, shaft 304 and/or pilot 308 may be attached to body 302. This attachment may be performed using various processes such as, for example, without limitation, welding, fasteners, adhesives, and/or some other suitable process for attaching components to each other.

In these examples, body 302, shaft 304, and pilot 308 may be constructed from various materials. The selected material for these components may be one that provides a capability to hold up during a chamfer forming process. The material may be, for example, without limitation, steel, aluminum, titanium, plastic, or some other suitable material.

Further, body 302 may have slot 312. Blade 314 may be a removable blade that may fit within slot 312. Blade 314 may be secured within slot 312 in a particular position using fastening system 315. In these examples, fastening system 315 may include clamp 316 and screw 318. Additionally, chamfer forming system 300 also may include guide 320. Guide 320 may have housing 322 and ring 324. Ring 324 may fit into cavity 326 of housing 322. In these examples, end 328 of pilot 308 may fit into hole 323 in ring 324. Ring 324 may provide stop element 329 to limit movement of pilot 308 into ring 324. Stop feature 333 in body 302 may engage stop element 329 as shown by arrow 327 in limiting movement of pilot 308 into ring 324.

Ring 324 may have depth 330. Depth 330 may be selected to determine when stop element 329 engages stop feature 333 in these examples, as illustrated by arrow 327. Depth 330 may correspond to depth 331 forming first chamfer 332 within hole 334 of structure 336. Hole 334 may have first end 335 and second end 337. Stop element 329 takes the form of positive stop 325 in these examples.

Depending on the desired depth for first chamfer 332, depth 330 of ring 324 may be changed by selecting another ring for ring 324. By changing depth 330, the distance pilot 308 travels through hole 334 before stop feature 333 engages stop element 329 may be changed. In other advantageous embodiments, ring 324 may be fixed within housing 322. In this type of embodiment, a new guide in place of guide 320 may then be selected for a different chamfer.

Structure 336 in this example may be lug 338 for an aircraft part. In particular, lug 338 may be, for example, without limitation, a lug for an aircraft hinge.

Guide 320 may be placed against side 340 of structure 336. First end 310 with pilot 308 extending from first end 310 may be placed into hole 334 from side 342, opposite side 340, through first end 335 of hole 334. In this manner, pilot 308 may engage and/or be received into ring 324 of guide 320.

Shaft 304 may be placed into tool holder 344 in drill 346. Tool holder 344 may be attached to spindle 343, which may be attached to motor 350. Tool holder 344 may be, for example, without limitation, a chuck. Drill 346 may rotate body 302 with blade 314 in a manner to cut and slash or form first chamfer 332. As first chamfer 332 is being cut for hole 334, pilot 308 may move further into ring 324.

At some point, stop feature 333 in body 302 may engage stop element 329 in ring 324. This engagement may occur when pilot 308 moves a distance of depth 330 into ring 324. At this point, first chamfer 332 may be complete and body 302 with pilot 308 may be disengaged from guide 320 and used to form another chamfer in another hole. In some advantageous embodiments, guide 320 may then be placed against side 340 to form a second chamfer. A second chamfer, such as second chamfer 351 with angle 353 may be formed in structure 336 on side 340 by rotating body 302 with pilot 308 to engage guide 320 from side 340.

In these different advantageous embodiments, blade 314 may be set to an appropriate position within slot 312 using setting ring 352. Setting ring 352 may have depth 354, which may be around the same distance as depth 331 for hole 334 in structure 336. Further, setting ring 352 also may include chamfer 356, which may have a shape, position, size, and/or orientation that may be around the same as first chamfer 332.

Pilot 308 may be placed through setting ring 352 into guide 320. Blade 314 may be set into selected position 358 within slot 312 in this configuration. Angle 303 in first chamfer 332 may be controlled by selecting angle 301 for blade 314. Further, setting ring 352 may be used to check the position of blade 314 between and/or during chamfer forming operations to ensure that a change in the position of blade 314 has not occurred to make first chamfer 332 out of tolerance. Also, this check may be made to determine whether blade 314 has worn from use such that first chamfer 332 may differ in size, depth, orientation, or some other suitable parameter from the desired settings.

The illustration of chamfer forming system 300 in FIG. 3 is provided for purposes of illustrating different features for different advantageous embodiments. This illustration is not meant to imply physical or architectural limitations in a manner in which different advantageous embodiments may be implemented. For example, in other advantageous embodiments, guide 320 may not use ring 324. Instead, cavity 326 may be configured to receive end 328 of pilot 308 and have depth 330 for controlling the depth of first chamfer 332.

In yet other advantageous embodiments, blade 314 may be adjusted to aid in setting depth 331 for first chamfer 332. The adjustment of blade 314 may be performed using guide 320 to set blade 314 at the desired location within spot 312 to cut depth 331 for first chamfer 332. As yet another example, stop feature 333 may be on pilot 308 rather than body 302.

Figure 4:
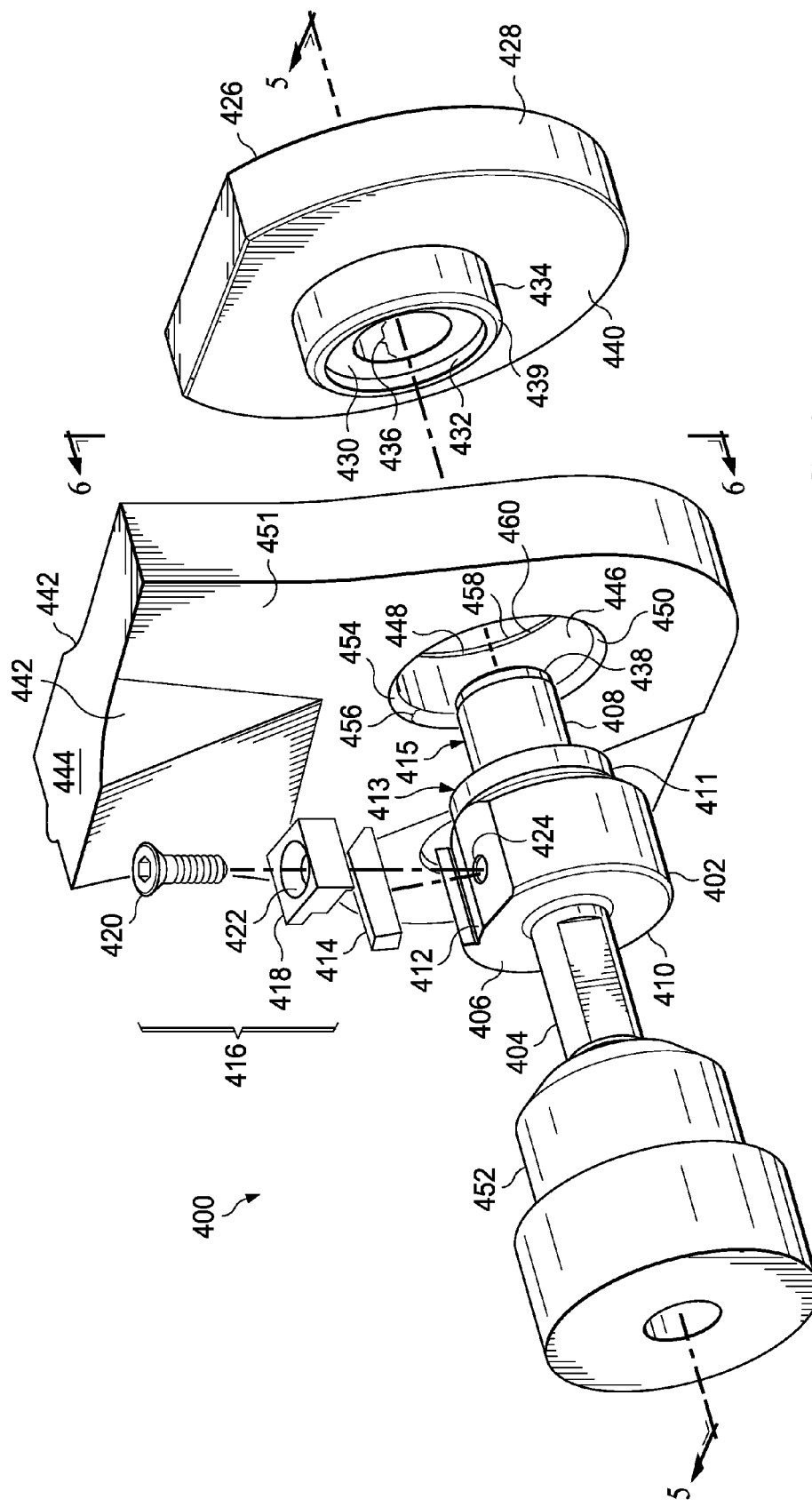
FIG. 4 is a diagram illustrating a chamfer forming system in accordance with an advantageous embodiment.

With reference now to FIG. 4, a diagram illustrating a chamfer forming system is depicted in accordance with an advantageous embodiment. In this example, chamfer forming system 400 is an example of one implementation of chamfer forming system 300 in FIG. 3. In this example, chamfer forming system 400 includes body 402. Body 402 may have shaft 404 extending from end 406. In this example, pilot 408 extends from end 410 of body 402. Body 402 may include stop feature 411. Stop feature 411 may be a portion of pilot 408 having a wider diameter at section 413 of body 402 as compared to section 415 of pilot 408.

In this example, shaft 404 and pilot 408 may be formed as an integral part of body 402. In other advantageous embodiments, these components may be attached to body 402 through various processes, such as, for example, without limitation, bonding, welding, and some other suitable attachment process. Body 402, shaft 404, and/or pilot 408 may be made from various materials. The particular material selected may depend on the hardness needed for these components. These materials may be, for example, without limitation, formed from steel, titanium, aluminum, alloy tool steels, or some other suitable materials.

In this example, body 402 may have slot 412 which may be formed radially into body 402. Blade 414 may be placed into slot 412 such that blade 414 may be positioned longitudinally along body 402.

Blade 414 may be formed from various materials. For example, without limitation, blade 414 may be formed using steel, titanium, high speed steel, carbide, or some other suitable material. Further, blade 414 may be tempered, case hardened, diamond coated, or otherwise treated. The particular material selected for blade 414 may differ depending on the particular material into which a chamfer may be formed.

In this example, fastening system 416 may secure blade 414 within slot 412. Fastening system 416 may be comprised of clamp 418 and screw 420. Screw 420 may secure clamp 418 to blade 414 on body 402 when screw 418 may be placed through hole 422 in clamp 418 and secured within hole 424 in body 402. In this illustrated example, hole 424 may be a threaded hole.

Chamfer forming system 300 also may include guide 426. Guide 426 may include housing 428 and ring 430. In this example, ring 430 fits within cavity 432 of housing 426. Cavity 432 may be formed through extension 434 in housing 428. In this example, ring 430 may be a bushing and may have depth 436. Ring 430 may receive end 438 of pilot 408. Surface 439 of ring 430 forms stop element 329 in these examples. Surface 439 may engage section 413 of body 402 to prevent pilot 408 from moving further into ring 430. Section 413 in pilot 408 may be an example of stop feature 333 in FIG. 3.

In operation, side 440 of guide 426 may be placed against side 442 of structure 444. This placement results in extension 434 of guide 426 being placed into hole 446. In this manner, extension 434 of guide 426 may be placed into end 448 of hole 446. End 438 of pilot 408 may be placed into end 450 of hole 446 on side 451 of structure 444 and 438 of pilot 408 may engage ring 430 within cavity 432.

Shaft 404 may be secured or engaged in tool holder 454. Rotation of shaft 404 causes body 402 with blade 414 to cut chamfer 454 within hole 446. Chamfer 454 may have depth 456, which may be controlled by depth 436 in ring 430. In these examples, depth 436 and depth 456 may have the same value. As blade 414 cuts into end 450 of hole 446, end 438 of pilot 408 moves farther into ring 430. Once pilot 408 may have traveled depth 436, section 413 of body 402 engages surface 439, and pilot 408 no longer moves deeper into hole 446. In this manner, depth 456 for chamfer 454 may be controlled.

If a new value is needed for depth 456, a new ring 430 may replace ring 430 and have a new depth, and may be placed into cavity 432.

In a similar fashion, guide 426 may be placed into end 450 of hole 446 and end 410 with pilot 408 extending from end 410 may be placed into end 448 of hole 446 to cut and form chamfer 458 with depth 460.

Figure 5:
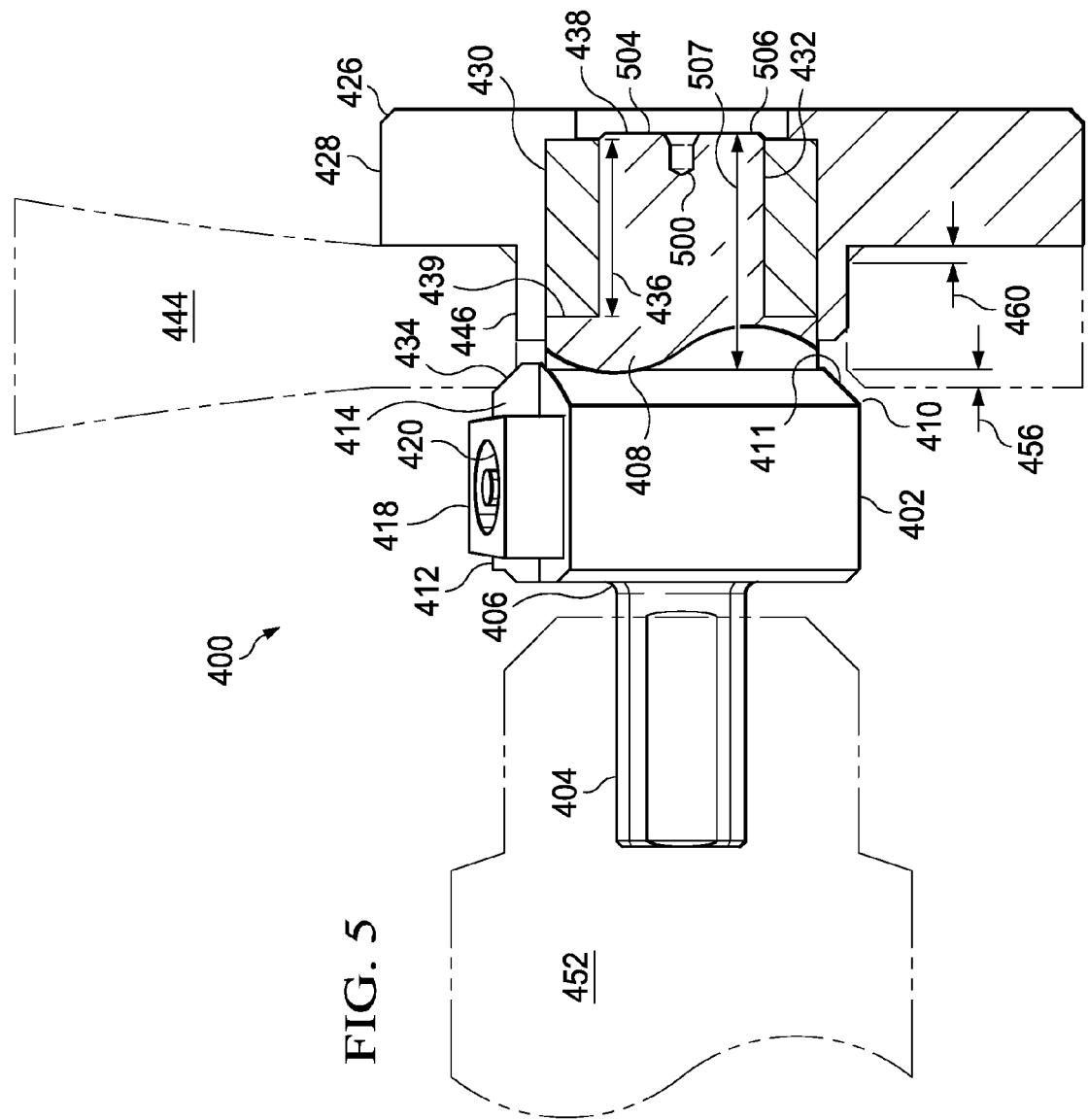
FIG. 5 is a side view of a chamfer forming system in accordance with an advantageous embodiment.

With reference now to FIG. 5, a side view of a chamfer forming system is depicted in accordance with an advantageous embodiment. In this figure, chamfer forming system 400 is shown in a cutaway and/or partially exposed view taken along lines 5-5 in FIG. 4.

In this example, pilot 408 in chamfer forming system 400 may have hole 500. Hole 500 may receive and engage engaging member 504, which may extend from wall 506 of cavity 432 in housing 428 of guide 426. In this view, pilot 408 may be fully engaged into ring 430 within housing 428. As can be seen, ring 430 may provide a positive stop through surface 439 (not shown on FIG. 5) to control depth 456 in FIG. 4 in chamfer 454.

Chamfer forming system 400 in FIGS. 4 and 5 illustrate shaft 404, body 402, pilot 408, and guide 426, each of which may have any of a number of possible lengths, depending on the particular implementation. In these examples, shaft 404 may have a length of around one inch and body 402 also may have a length of around one inch. In addition, pilot 408 may be received by and housed in guide 426. Guide 426 may have a total length of around 0.7 inches. Chamfer forming system 400 may have a total length of around 2.7 inches. These examples are not intended to provide limitations to the manner in which other advantageous embodiments may be implemented. For example, in other advantageous embodiments, chamfer forming system 400 may have other suitable sizes contemplated for a particular chamfer, structure, or other suitable consideration in forming chamfers.

The illustration of chamfer forming system 400 in FIGS. 4 and 5 have been presented for purposes of illustrating one manner in which an advantageous embodiment may be implemented. This illustration is not meant to imply physical or architectural limitations to the manner in which other advantageous embodiments may be implemented.

For example, without limitation, surface 439 may function as stop element 329 in ring 430, while section 413 functions as stop feature 333 that engages stop element 329. In other advantageous embodiments, other features may be used to implement stop feature 333 and stop element 329. Also, rather than using surface 439, a wall in housing 428 may provide stop element 329, while end 438 on pilot 408 may function as stop feature 333. When end 438 reaches a wall within housing 428, pilot 408 may stop moving through hole 446. Of course, other advantageous embodiments may employ other types of stop features and/or stop elements. In yet another advantageous embodiment, a blade in addition to blade 414 may be used and positioned on body 402 in any suitable location by any suitable means.

Figure 6:
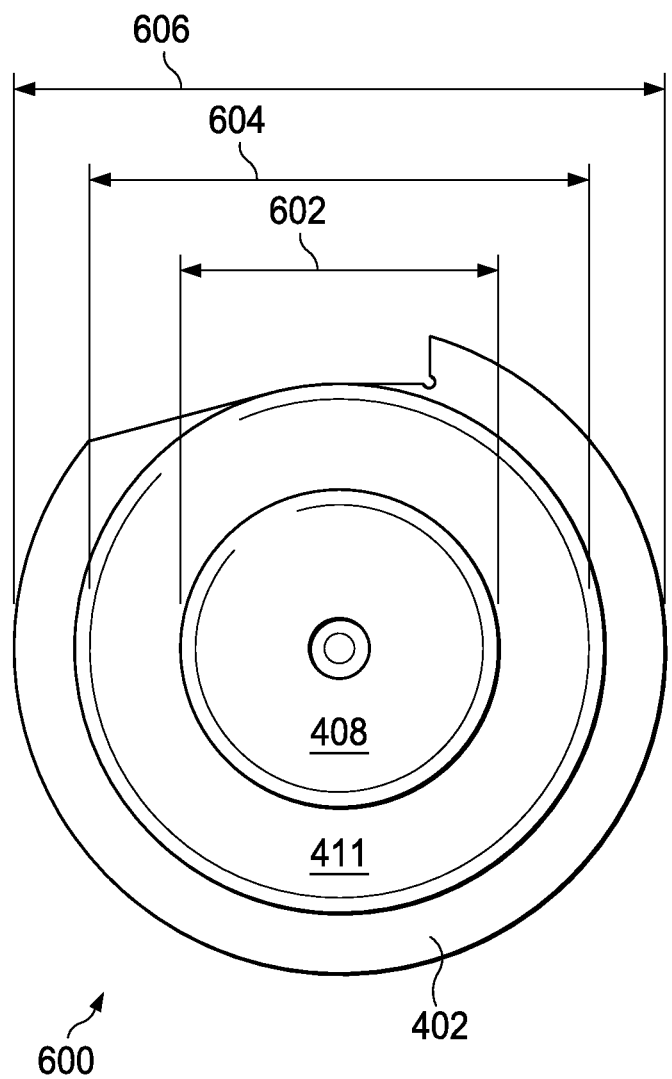
FIG. 6 is a diagram illustrating a front view of a chamfer forming system in accordance with an advantageous embodiment.

With reference now to FIG. 6, a diagram illustrating a front view of a chamfer forming system is depicted in accordance with an advantageous embodiment. In FIG. 6, the front view of chamfer forming system 400 is taken along lines 6-6. In this example, pilot 408, stop feature 411, and body 402 in chamfer forming system 400 in FIGS. 4 and 6 may be seen. Each of these components may have any of a number of possible diameters.

For example, without limitation, pilot 408 may have diameter 602 which may be around 0.625 inches; section 413 of pilot 408 may have diameter 604 which may be around 1.0 inches; and body 402 may have diameter 606 which may be around 1.31 inches. These exemplary diameters are provided for purposes of illustrating one implementation of chamfer forming system 400. For example, without limitation, the diameter of section 413 of pilot 408 may be varied depending on the diameter of hole 446. Other advantageous embodiments may have other suitable sizes and/or diameters contemplated for creating chamfers for other sizes of hole 446.

In these illustrative examples, length 507 in FIG. 5 of pilot 408 may vary depending on the thickness of structure 444 and/or diameter 602 of pilot 408 may vary depending on the diameter of hole 446. For example, without limitation, a diameter of around 06.25 inches for section 413 may be used in hole 446 having a diameter of around 0.625 inches. In some advantageous embodiments, pilot 408 may have more than one diameter to allow for pilot 408 to be used with different sized holes.

Figure 7:
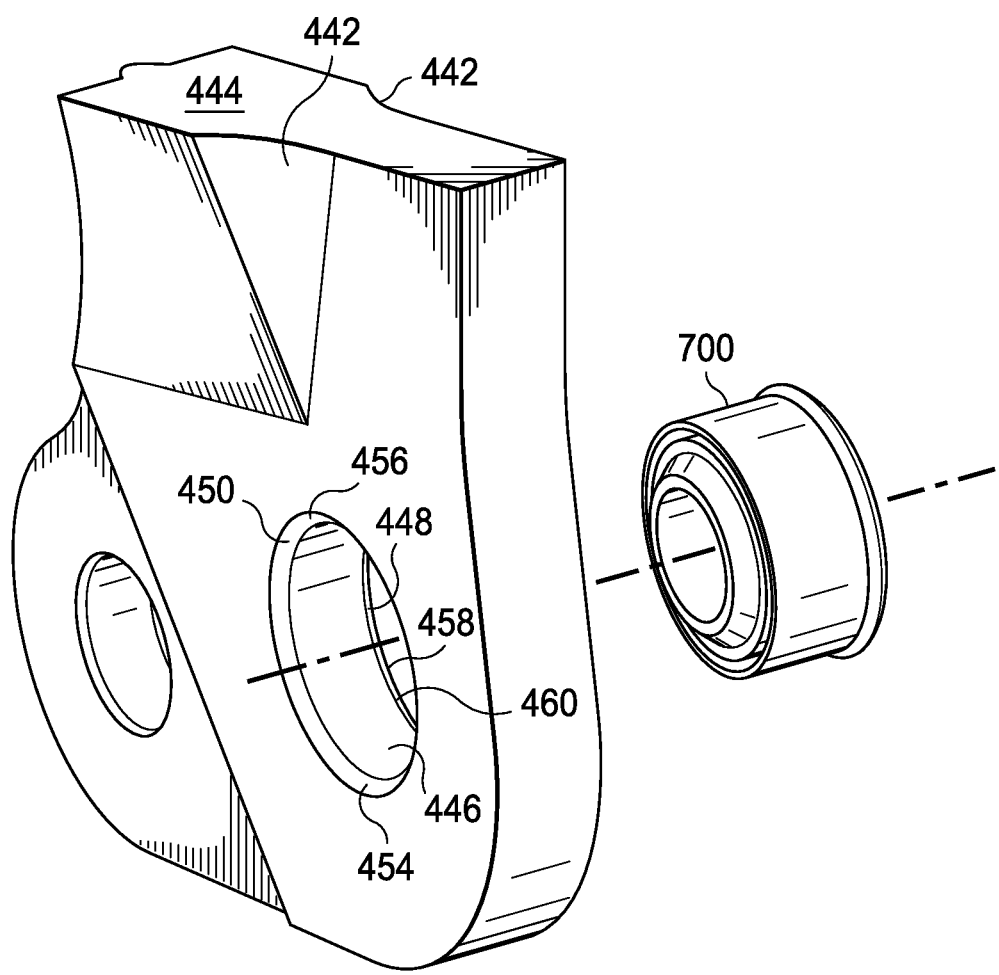
FIG. 7 is a diagram illustrating a chamfer in accordance with an advantageous embodiment.

With reference now to FIG. 7, a diagram illustrating a chamfer is depicted in accordance with an advantageous embodiment. In this example, hole 446 includes chamfer 454 on end 450 and chamfer 458 on end 448. Bearing 700 may be placed into end 458 of hole 446. In this example, bearing 600 may be a mono-ball bearing, which may be part of a structure such as, for example, without limitation, a trailing edge flap assembly and/or any type of flanged bearing which may require staking to provide a positive location for installation.

Figure 8:
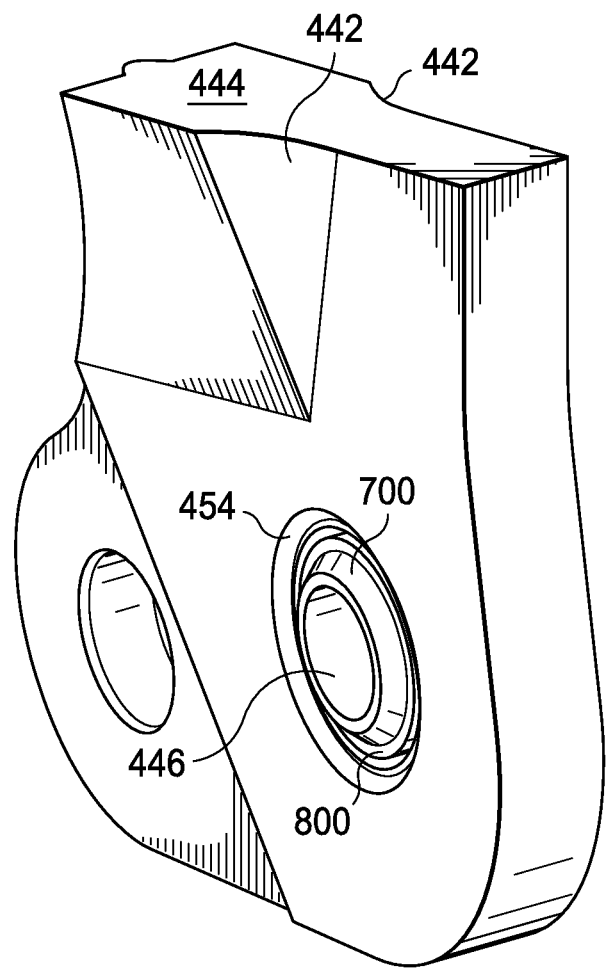
FIG. 8 is a diagram illustrating a bearing secured within a hole in accordance with an advantageous embodiment.

With reference now to FIG. 8, a diagram illustrating a bearing 700 secured within hole 446 is depicted in accordance with an advantageous embodiment. In this example, bearing 700 may be at least partially retained within hole 446 by forming lip 800 of bearing 700 over chamfer 454. Lip 800 may be formed over chamfer 454 by crimping, staking, or otherwise forming lip 800 over chamfer 454. This process may prevent migration of bearing 700 within hole 446.

If chamfer 454 does not have a desired value for depth 456 (not shown), then bearing 700 may not form a fit within tolerance to structure 444. The desired value of chamfer 454 may include, for example, without limitation, angle 303, which may correspond to angle 301 for blade 314. In these examples, structure 444 may take various forms. For example, without limitation, structure 444 may be, for example, a lug, a clevis, or some other suitable structure for receiving bearing 700.

Figure 9:
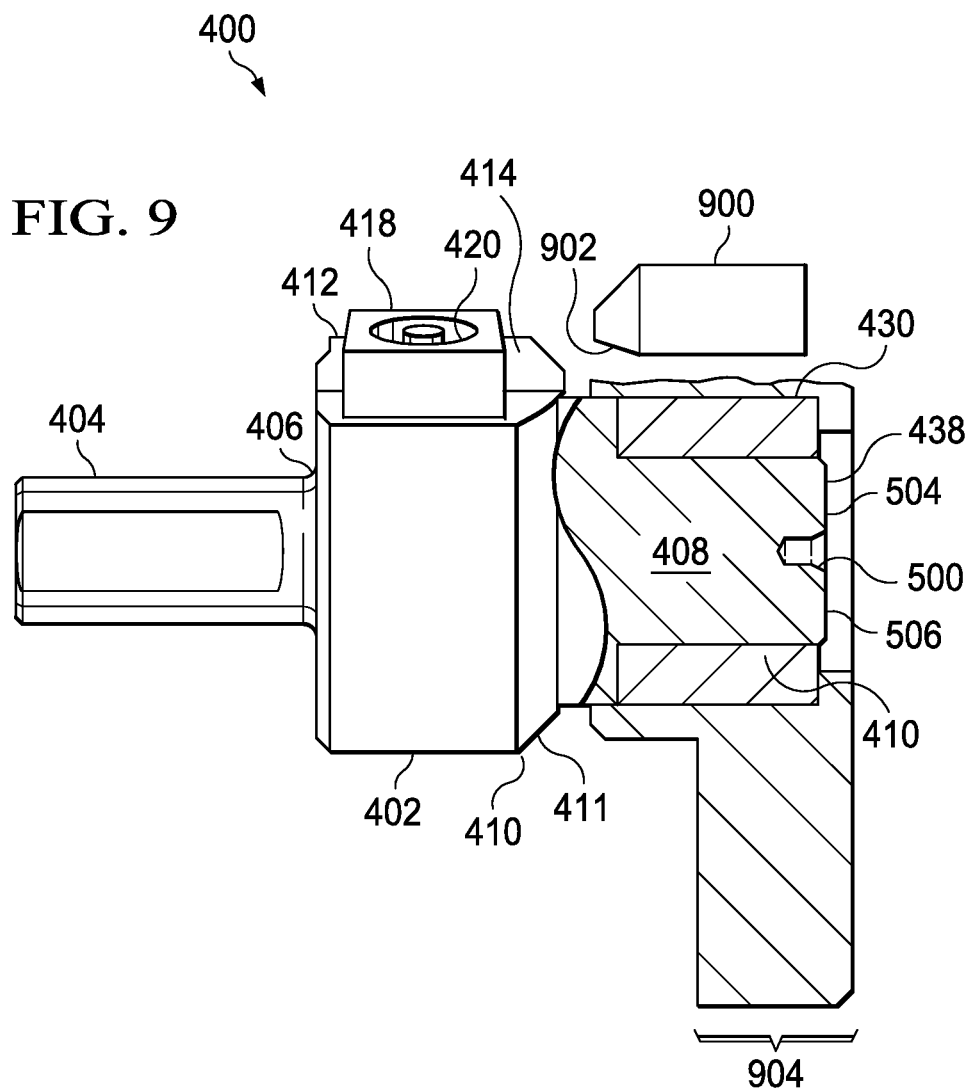
FIG. 9 is a diagram illustrating setting a chamfer forming system in accordance with an advantageous embodiment.

With reference now to FIG. 9, a diagram illustrating setting a chamfer forming system is depicted in accordance with an advantageous embodiment. In this example, blade 414 in chamfer forming system 400 may be set to an appropriate depth to cut a desired chamfer within a part. In this example, setting ring 900 provides a capability to set blade 414. Setting ring 900 may have chamfer 902 and depth 904. Depth 904 may be a depth that may be around the same depth as structure 444 (not shown) at which hole 446 (not shown) is located. Chamfer 902 may mimic or may be around the same depth and orientation as chamfer 454 (not shown). Pilot 408 may be placed through setting ring 900 into guide 426 to set blade 414.

In addition to being used to set blade 414, setting ring 900 also may be used to check blade 414 during chamfer forming operations. This check may be made to ensure that the position of blade 414 and/or wear that may occur on blade 414 does not change a chamfer that may be formed using chamfer system 400. In these examples, the position may be relative to setting ring 900.

Figure 10:
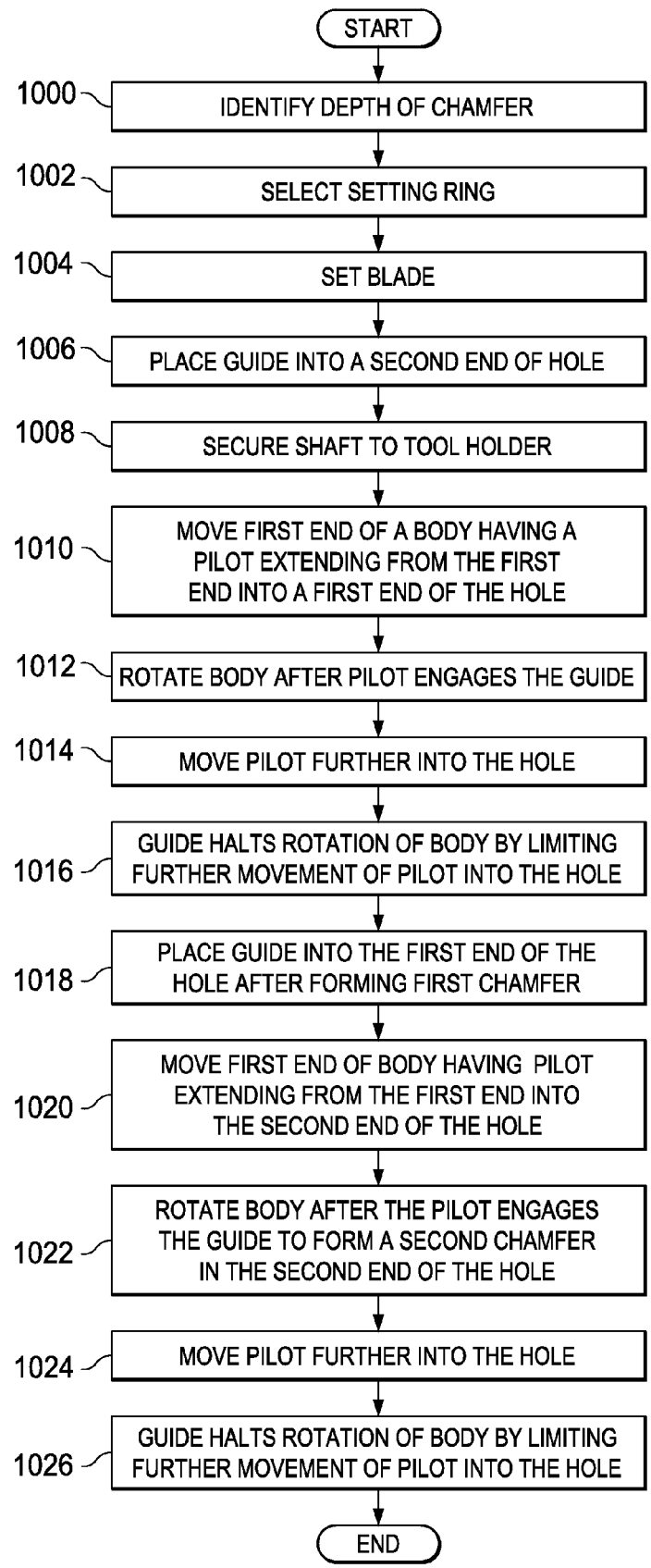
FIG. 10 is a flowchart of a process for forming chamfers in a hole in accordance with an advantageous embodiment.

With reference now to FIG. 10, a flowchart of a process for forming chamfers in a hole is depicted in accordance with an advantageous embodiment. The process illustrated in FIG. 10 may be implemented using chamfer forming system 300 in FIG. 3.

The process may begin by identifying a depth for first chamfer 332 for hole 334 (operation 1000). Thereafter, the process may select setting ring 352 (operation 1002). Setting ring 352 may have a depth that may be used to control the depth of the chamfer. Setting ring 352 may be used to set the position of blade 314 (operation 1004).

Guide 320 may be placed into second end 337 of hole 334 (operation 1006). Shaft 304 may be secured to tool holder 344 for drill 346 (operation 1008). The process then may move first end 310 of body 302 having pilot 308 extending from first end 310 into first end 335 of hole 334 (operation 1010).

Body 302 may be rotated after pilot 308 engages guide 320 (operation 1012). In operation 1012, pilot 308 may engage ring 334 placed into cavity 326 of guide 320. The process may then move pilot 308 further into hole 334 (operation 1014). The movement of pilot 308 further into hole 334 causes blade 314 to cut first chamfer 332 into the side of hole 338. The rotation of body 302 may be halted when guide 320 limits further movement of pilot 308 into hole 334 (operation 1016).

When pilot 308 is no longer capable of being moved further into hole 334, first chamfer 332 may be complete with the desired depth and chamfer angle. The process may then place guide 320 into first end 335 of hole 334 after forming first chamfer 332 (operation 1018). The process may move first end 310 of body 302 having pilot 308 extending from first end 310 into second end 337 of hole 334 (operation 1020). Body 302 is rotated after pilot 308 engages guide 320 to form second chamfer 351 in second end 337 of hole 334 (operation 1022).

The process may move pilot 308 further into hole 334 while body 302 rotates (operation 1024). Guide 320 may then halt rotation of body 302 by limiting further movement of pilot 308 into hole 334 (operation 1026), with the process terminating thereafter. When pilot 308 is no longer capable of being moved further into hole 334, first chamfer 332 may be complete with the desired depth and chamfer angle.

The illustration of the different operations in FIG. 10 are provided as an example of one manner in which a chamfer may be created using a chamfer forming system in accordance with an advantageous embodiment. In other implementations, other operations may be used in addition to or in place of the ones illustrated. Further, operations also may be performed in a different order.

For example, without limitation, operation 1008 may be performed after operation 1010 or may be performed prior to operation 1006 in these examples. As yet another example, operations 1006, 1010, 1012, 1014, and 1016 may be performed on an opposite end of the hole to create a second chamfer such that the hole may have a chamfer on either end. Further, operations 1000, 1002, and 1004 may be performed for the second chamfer if a different depth is desired.

Thus, the different advantageous embodiments provide a method and apparatus for forming a chamfer. In the different advantageous embodiments, a replaceable blade may allow an operator to quickly replace a cutting edge during the forming of a chamfer and/or between forming chamfers. Further, the guide provided in the different advantageous embodiments may have a set depth allowing an operator to set the proper depth of a cut whenever a blade replacement may be needed. Further, this feature also allows for a quick setting of the blade without having to perform measurements.

Thus, the different advantageous embodiments may not require checking a blade prior to cutting a chamfer. With the use of the ring and the removable blade, the different advantageous embodiments provide a capability to ensure that a proper depth is set for a blade whenever a blade replacement may occur or to just check the depth of the current setting.

The description of the different advantageous embodiments has been presented for purposes of illustration and description, and is not intended to be exhaustive or limited to the embodiments in the form disclosed. Many modifications and variations will be apparent to those of ordinary skill in the art. For example, without limitation, other different advantageous embodiments have been shown with respect to creating chamfers in a hole for a bearing in an aircraft part. Other advantageous embodiments may be applied to other manufacturing processes for other types of structures.

For example, without limitation, the different advantageous embodiments may be applied to creating chamfers and/or countersinks for holes for fasteners used to join parts to each other. These chamfers may be for parts in structures such as, for example, without limitation, a car, a building, a car plant, a spacecraft, or some other suitable structure. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising: a body having a first end and a second end; a pilot extending from the first end of the body; a blade directly attached to the body and positioned longitudinally on the body at the first end; a shaft extending from the second end of the body; and a guide configured to receive the pilot, wherein the guide has a stop element configured to control a depth of a chamfer formed by the blade, wherein the guide comprises: a housing having a cavity; and a positive stop located within the cavity, wherein the positive stop is configured to engage a stop feature on the body.

2. The apparatus of claim 1, the blade being about parallel to a longitudinal axis of the body, the blade further disposed in a longitudinal slot formed in an outside surface of the body.

3. The apparatus of claim 1, wherein the positive stop is a ring configured to receive an end of the pilot.

4. The apparatus of claim 1 further comprising:
  a slot formed in the body, wherein the slot is configured to receive the blade.

5. The apparatus of claim 4 further comprising:
  a fastening system configured to secure the blade within the slot.

6. The apparatus of claim 5, wherein the fastening system comprises:
  a clamp; and
  a screw, wherein the clamp and the screw are configured to secure the blade in the slot.

7. The apparatus of claim 1, wherein the blade is configured to move to a selected position with respect to the first end of the body.

8. The apparatus of claim 1 further comprising:
  a drill having a tool holder, wherein the shaft is configured to be secured in the tool holder.

9. The apparatus of claim 1 further comprising:
a structure having a hole with a first end and a second end, wherein the hole is configured to receive the guide at the first end of the hole and the first end of the body with the pilot at the second end of the hole and wherein the pilot engages the guide.

10. The apparatus of claim 9, wherein the structure is a lug for an aircraft hinge.

11. A chamfer forming system comprising:
a body having a first end, a second end, and a slot formed in the body;
a pilot extending from the first end of the body;
a blade configured to be secured in the slot and positioned longitudinally on the body at the first end and configured to move to a selected position with respect to the first end of the body;
a shaft extending from the second end of the body;
a guide having a housing with a cavity and a ring capable of being placed in the cavity and providing a positive stop, wherein the ring is configured to receive an end of the pilot and is configured to control a depth of a chamfer formed by the blade;
a clamp;
a screw, wherein the clamp and the screw are configured to secure the blade in the slot;
a drill having a tool holder, wherein the shaft is configured to be secured in the tool holder; and
a lug for an aircraft hinge having a hole with a first end and a second end, wherein the hole is configured to receive the guide at the first end of the hole and the first end of the body with the pilot at the second end of the hole and wherein the pilot engages the guide.

\* \* \* \* \*